Nov. 15, 1960   G. E. HENNING   2,960,482
METHOD OF MAKING PLASTIC ARTICLES
Filed May 15, 1957   2 Sheets-Sheet 1

INVENTOR.
G. E. HENNING
BY A.C. Schwarz, Jr
ATTORNEY

United States Patent Office 2,960,482
Patented Nov. 15, 1960

2,960,482

METHOD OF MAKING PLASTIC ARTICLES

George E. Henning, Baltimore, Md., assignor to Western Electric Company, Incorporated, New York, N.Y., a corporation of New York Filed May 15, 1957, Ser. No. 659,239

3 Claims. (Cl. 260—2.5)

This invention relates to methods of making plastic articles, and more particularly to methods of making solid and expanded polyethylene extrusions.

In the manufacture of certain types of insulated conductors for use in communication devices, an insulating covering of a plastic material, such as polyethylene, is extruded around the conductor by means of an extrusion machine. Such a machine is provided with a die through which the conductor advances, and the die shapes the plastic material into a covering around the advancing conductor.

There is a tendency for some of the plastic material being extruded through such a die to adhere to the exit end of the die from which the extruded material emerges. The material so deposited on the die usually builds up into a large, toroidal mass, which eventually breaks loose from the die, completely encircles the insulating covering formed around the conductor and adheres tenaciously to the covering. This effect is termed "drooling" in the extrusion art, and the ring of plastic material which is deposited on an insulated covering is called "drool." This drool is manifestly undesirable because it diminishes the quality of the extruded covering and also may cause damage to the insulation and to the apparatus that performs further operations on the insulated conductor.

Polyethylene is, in some cases, mixed with certain blowing agents so as to produce a blend suitable for extruding into expanded polyethylene products, such as insulating coverings for electrical conductors. While extruding such a polyethylene blowing-agent blend, it was found that decomposition residues were precipitated from the molten compound on the hottest parts of the extruder, such as the cylinder bore, screw and die. This residue adheres tenaciously to the metal and requires considerable scraping and brushing to remove. The residue builds up on the screw and die surfaces, thus undesirably changing extrusion conditions and the shape of the die orifice, which changes the shape of the extruded product. These deposits on the die also cause a gradual build-up in pressure and a resulting build-up in temperature inside the extrusion chamber.

It is, therefore, an object of the present invention to reduce the viscous drool formed at the exit end of an extrusion orifice when extruding polyethylene.

Another object is to reduce decomposition products formed on and in extrusion apparatus when extruding a polyethylene and blowing-agent mixture.

A problem which is present in the use of dust-like blowing agents with polyethylene is set out below: if no agent is used to cause the blowing agent to adhere to the polyethylene granules, the blowing agent tends to segregate at the bottom of the extruder hopper, thus producing a mixture at the bottom of the hopper which is too rich in blowing agent and a mixture in the upper portion of the hopper which is too lean in blowing agent.

It is therefore, another object of the present invention to improve the blending of polyethylene and blowing agent.

In the manufacture of insulated conductors and cables having insulating covers of expanded plastic, it is desirable that the conductivity of the insulating cover be as low as possible and that the power factor (cosine of the phase angle of current flow through the insulation) also be as low as possible.

Another object of the present invention is to provide methods of making expanded polyethylene having improved electrical insulating properties.

A method of making a plastic product, which embodies the present invention, might include the steps of mixing polyethylene and diethylene glycol in predetermined proportions, and extruding the resultant mixture.

A complete understanding of the invention may be obtained from the following detailed description, when read in conjunction with the appended drawings, in which.

Figure 1:
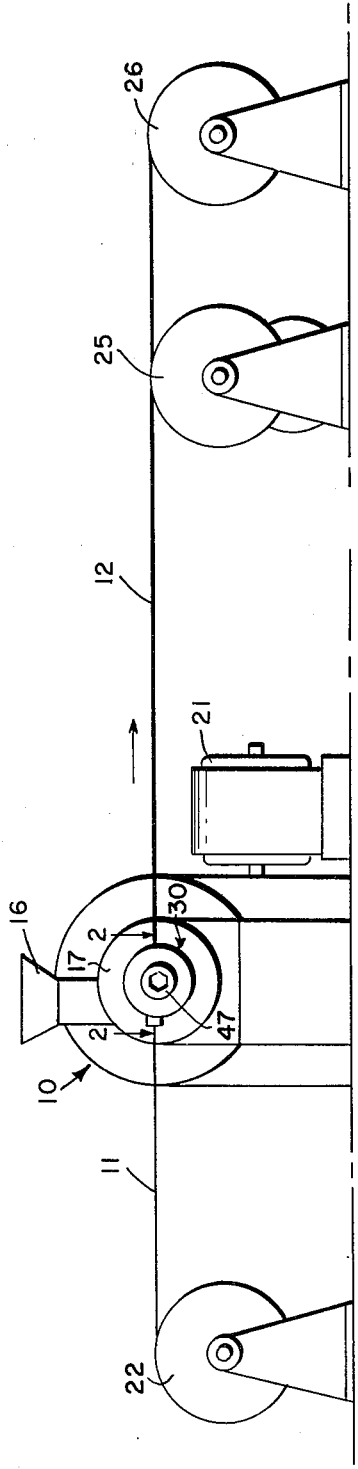
Fig. 1 is a side elevation of apparatus for use in a process embodying a portion of the invention.
Figure 3:
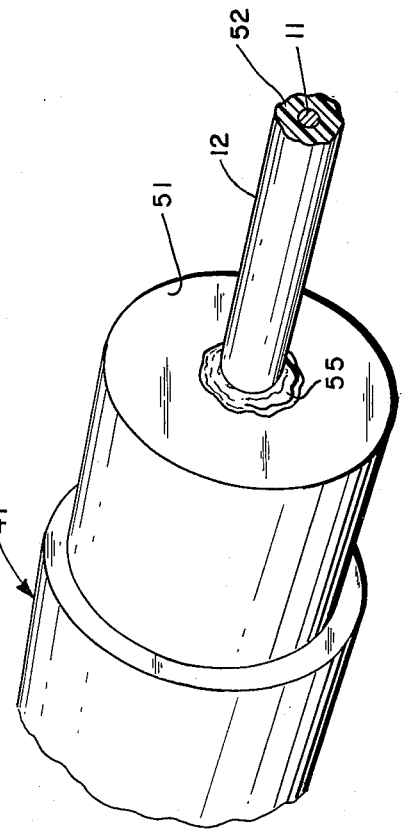
Fig. 3 is an enlarged, fragmentary, perspective view of a die forming a portion of the apparatus of Figs. 1 and 2.
Figure 2:
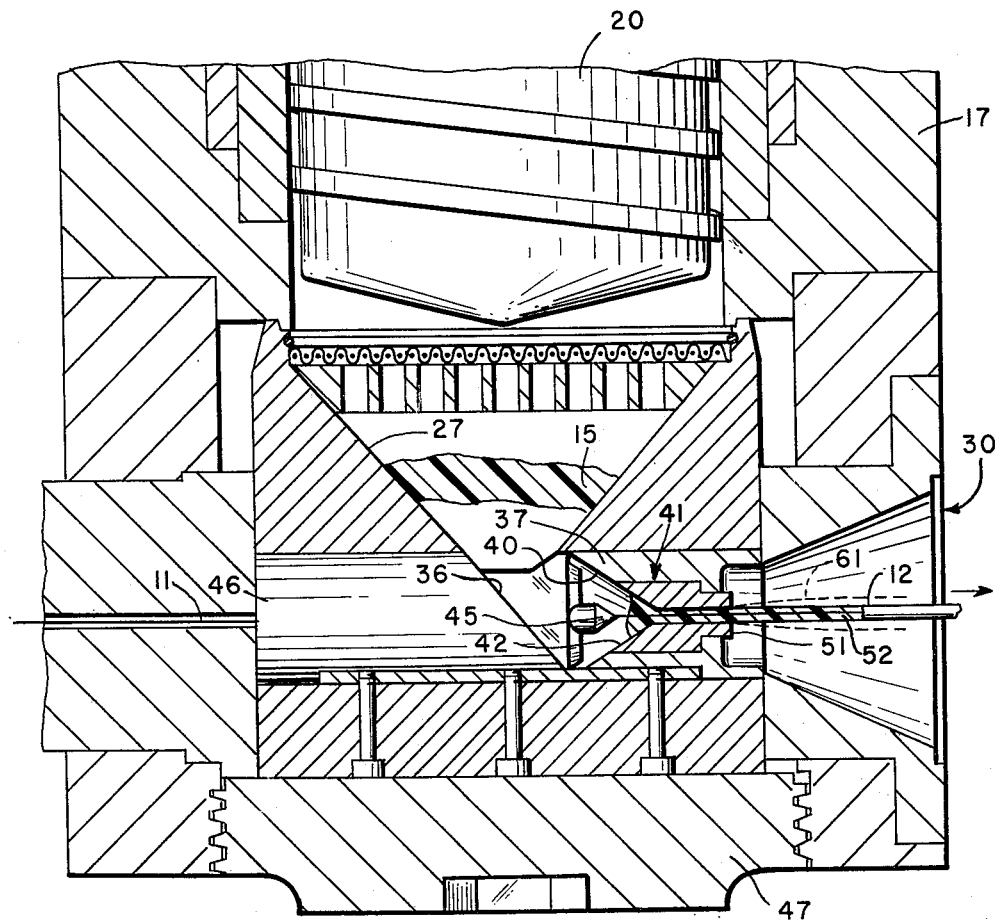
Fig. 2 is an enlarged, fragmentary, horizontal section taken along line 2—2 of Fig. 1.

Referring now in detail to the drawings, and more particularly to Figs. 1 and 2, an extruder, designated generally by the numeral 10, is provided to extrude a suitable plastic material 15, such as polyethylene, onto a bare, filamentary, electrical conductor 11 to form an insulated covering, the insulated conductor being designated by the numeral 12. Polyethylene in granular form is placed in a feed hopper 16 and from there it flows into an extrusion cylinder 17. A stock screw 20 (Fig. 2), which is rotated by a motor 21, is positioned within the extrusion cylinder 17. The stock screw 20 works the plastic material 15 and impels it along the cylinder 17. The conductor 11 is advanced to the extruder 10 from a supply stand 22 and is pulled through the extruder 10 by a capstan 25. The insulated conductor 12 passes around the capstan 25 and finally is wound upon a take-up reel 26.

Referring to Fig. 2, the plastic material 15 is forced by the stock screw 20 along the extrusion cylinder 17 and into a tapered passageway 27 formed in an extruding head 30, secured suitably to the extrusion cylinder 17. The plastic material 15 is forced by the stock screw 20 through the tapered passageway 27 and into an extrusion passage 36, formed in the extruding head 30 and positioned at right angles to the axis of the extrusion cylinder 17.

Positioned within the extrusion passage 36 is a die holder 37 which is provided with a bore 40, a portion of which is frustoconical in shape and formed at a predetermined angle with respect to the longitudinal axis of the die holder 37. A forming die, designated generally by the numeral 41, is inserted within the die holder 37 and is provided with a bore 42, a portion of which is also frustoconical in shape and forms an extension of the frustoconical portion of the bore 40 in the die holder 37. The conductor 11 is directed toward the bore 42 within the die 41 by a core tube 45, secured suitably within a core tube holder 46. The various tools described hereinabove are secured within the extruding head 30 by a binder nut 47.

The die 41, a conventional extrusion die, is shown in Fig. 2 and includes a flat face 51 that is perpendicular to the axis of the bore 42, which is formed centrally and longitudinally of the die. The conductor 11 is advanced through the bore 42 and has a sheath 52 of the plastic material applied continuously therearound to form the insulated conductor 12. As the conductor 11 passes through the die 41, there is a tendency for some of the polyethylene insulating material to adhere to the face 51 of the die 41 in the form of globules instead of being applied around the conductor 11 as part of the covering 52. Such globules steadily increase in size and may finally be formed into a toroidal mass 55.

As the mass 55 of plastic material increases in size, the plastic covering 52 being applied to the conductor 11 exerts a force thereon that tends to pull it onto the insulated conductor 12. Finally, the mass 55 breaks away from the die 41, completely encircles the insulated covering 12 and adheres tenaciously thereto to form a mass of drool thereon. Obviously, the presence of masses of drool at intervals on the finished insulated conductor is deleterious. Also, such irregularities may cause damage in apparatus used to perform subsequent operations on the covered conductor 11.

It is believed that at least one of the causes of drooling when extruding polyethylene is the incompatibility of polyethylene with certain other substances mixed with the polyethylene before extrusion. Because of this incompatibility, and as a result of the working action of the stock screw 20, the heavier fractions of the incompatible ingredients in the polyethylene tend to segregate in the vicinity of the outward periphery of the stream of polyethylene being forced through the extruder 10, for example, along the inner surface of the cylinder 17, along the surfaces of the passageway 27, along the surface of the passage 36 and along the bore 42 of the die 41. Such incompatible ingredients in the polyethylene mix may consist of small amounts of antioxidant, carbon black, color pigment and/or impurities. When the polyethylene is extruded from the die 41, these ingredients, moving along with the outer periphery of the stream, are attached to the face 51 of the die 41 by means of a small fraction of polyethylene, which binds the particles together and causes them to adhere to the face 51.

It has been found that by addition to the polyethylene of diethylene glycol, hereinafter referred to as DEG, in the proportions of between ½ part and 1 part of DEG by weight, to approximately 100 parts of polyethylene by weight, the drool formed on the insulated conductor can be eliminated or at least materially reduced. The DEG may be mixed with the polyethylene in any suitable mixer, such as a ribbon blender, a drum tumbler, a mechanical agitator or any other suitable mixer. It is a simple accomplishment to distribute the DEG completely throughout the polyethylene because the DEG coats and adheres to each polyethylene granule.

The resulting composite extrusion material may be extruded in the manner above-described with respect to conventional polyethylene granules, yet little or no drool will be formed. It is believed that the DEG in the composite mixture acts as a vehicle in which the incompatible particles are dispersed and which prevents a small fraction of polyethylene from binding them together, thus effectively preventing them from adhering to the face 51 of the die 41 at the exit end of the bore 42 and also preventing them from adhering to the insulated conductor 12.

Because of resulting better electrical properties and also for economical reasons, a blowing agent may be added to the polyethylene prior to extrusion from the extruder 10 so as to produce an expanded insulating covering for the conductor 11. As the conductor 11 with covering thereon leaves the die face 51, its shape would appear as shown at 61 in Fig. 2 in dotted lines, due to the expansion of the blowing agent upon reaching a reduced pressure area as it leaves the die 41.

When polyethylene is expanded in such a manner, the problem of drool is increased. There is more of a tendency for a mass, such as that shown as 55, to form and to adhere tenaciously to the conductor 11. It is believed that the increased amount of drool is caused by the increasing diameter of the expanding material 61 as it leaves the die 41. DEG can be added to the polyethylene prior to extrusion in the manner and proportions above-described to eliminate or materially reduce such drool.

When the blowing agent being used with the polyethylene is an organic blowing agent, such as, for example, Celogen–AZ (a dust-like, nitrogen-type blowing agent manufactured by the Naugatuck Chemical Division of the United States Rubber Company, Naugatuck, Conn.) an additional incompatible substance besides the already-mentioned antioxidant, carbon black, etc. will be present in the polyethylene mixture when it is extruded. This substance is the nongaseous decomposition product of the organic blowing agent. If the material, such as DEG, which is added to the polyethylene, also has the property of dissolving this decomposition product, then the drool reduction or elimination will be more pronounced. Such as the case when Celogen–AZ and diethylene glycol are used.

Tests have been made upon conductors covered with expanded polyethylene containing DEG in the proportions above-described, the results of which show that the DEG greatly reduces the conductivity and the power factor of the expanded insulating cover. Values of as low as .0004 mho for conductance and as low as .0002 for power factor have been achieved for certain samples tested in water. These values can be compared to control sample values of .0014 mho for conductance and .0009 for power factor. Other tests showed that the dielectric strength of the test samples was notably increased over the control samples in which DEG was not used. It is believed that these improved electrical properties are the result of the fact that the DEG causes formation of a smaller cell in the expanded cellular structure, which cell is able to maintain water excluded therefrom and are also the result of the fact that any incompatible particles on the insulation surface coated with DEG are less apt to contain occluded moisture.

The addition of DEG to a polyethylene and blowing-agent blend prior to extrusion has been found to produce other advantageous results. When the blowing agent used is a dust-like blowing agent, the DEG has been found to prevent segregation of the blowing agent at the bottom of the hopper of the extruder and to maintain the blowing agent well distributed throughout the blend. This desirable property is the result of the blowing agent adhering to and being contained within the DEG which coats and adheres to the individual polyethylene granules.

Referring to Fig. 2, a further problem present in the use of certain polyethylene and organic-blowing-agent blends is that, when the blowing agent decomposes in the extruder, the nongaseous decomposition products precipitate upon the hottest parts of the extruder, such as the inside surface of the cylinder 17, the root of the screw 20 and the surfaces of the bore 42 of the die 41. The deposits on the inside of the die cause an undesirable change in shape of the die orifice which changes the shape of the extruded product. The decreasing size of the die orifice causes a gradual build up in pressure and a resulting build up in temperature inside the extrusion chamber, both of which are undesirable because they interfere with proper control of the extrusion process. Examples of suitable organic blowing agents other than Celogen–AZ are p,p'-oxy-bis-benzenesulfonylhydrazide and dinitrosopentamethylenetetramine. The blowing agents useful in the practice of the invention, typified by the ones just mentioned, must be compatible with polyethylene and diethylene glycol, and be thermally decomposable at the temperatures experienced in the extrusion of polyethylene into gaseous products leaving no polar residue.

An advantageous result of the addition of DEG to a polyethylene and organic-blowing-agent blend, in the proportions of between ½ part and 1 part of DEG by weight to approximately 100 parts of polyethylene by weight is the elimination or minimization of such decomposition product precipitation. This action is believed to result partly because DEG has a solvating effect on some of the decomposition end products, and partly because it acts as a dispersing agent for any insoluble fractions, which causes most of the decomposition end products to move out of the extruder with the polyethylene stream. It is important that the medium selected to accomplish the above result be in itself heat stable so that no objectionable residues are formed as a result of the processing temperature.

The following specific example is provided to better illustrate a portion of the invention: one part DEG by weight, 2 parts Celogen–AZ by weight and 197.22 parts polyethylene granules by weight, were mixed together in a ribbon blender. As the blender mixed the substance, the liquid DEG was distributed uniformly over the surfaces of the granules of polyethylene. The Celogen–AZ, being of a dust-like nature, was contained within the liquid DEG and also was distributed uniformly over the surfaces of the granules of polyethylene. The mixture was removed from the ribbon blender and placed in the hopper 16 of the extruder 10.

The extruder was operated as above-described. The usual problem of segregation of the dust-like blowing agent at the bottom of the extruder hopper 16 was not encountered and there was a complete absence of the usual viscous drool that normally accumulates at the face 51 of the die 41. The head pressure, measured inside the head 30, was maintained at a steady value of approximately 2300 p.s.i. As a comparison, on one occasion, without DEG in the mix, the pressure within the head had increased to 3700 p.s.i. after four hours of operation, because of decomposition products of the Celogen–AZ depositing on the inner surfaces of the die.

The conductor which was covered in the present specific example consisted of 16 gauge copper wire and the diameter of the expanded polyethylene covering was .14 inch. The covered conductor was cut into 10 foot lengths and the conductance and power factor were determined and the conductance and power factor were determined to be .0005 mho and .0003, respectively, by testing the insulation in water. These values compared very favorably with control samples of the same size and composition (with the exception that DEG was not included) and which gave results of .0014 mho conductance and .0009 power factor. After the extrusion operation, the extruder 10 was disassembled and found to have little or no decomposition products on the inside surface of the cylinder 17, the outer surfaces of the screw 20 and the inner surfaces of the die 41.

In summary, the advantages of addition of DEG to a polyethylene extrusion mix are at least fourfold. First, drool is reduced or eliminated; second, the DEG causes the dust-like blowing agent to adhere uniformly to the polyethylene granules; third, electrical properties of an expanded product are improved, and fourth, deposition of decomposition residue of an organic blowing agent is reduced or eliminated.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of producing polyethylene articles, which comprises the steps of blending 100 parts by weight of polyethylene with from about ½ part to about 1 part by weight of diethylene glycol, and then extruding the resultant mixture into a desired shape.

2. The method of producing cellular polyethylene articles, which comprises the steps of blending 100 parts by weight of polyethylene with from about ½ part to about 1 part by weight of a liquid diethylene glycol and with a minor proportion of a finely divided, heat-decomposable, organic blowing agent for polyethylene, and then extruding the resultant mixture into a desired cellular shape.

3. The method of producing cellular polyethylene articles, which comprises the steps of blending 100 parts by weight of granular polyethylene with from about ½ part to about 1 part by weight of a liquid diethylene glycol and with a minor proportion of finely divided dinitrosopentamethylenetetramine, a heat-decomposable, organic blowing agent for polyethylene, and then extruding the resultant mixture into a desired cellular shape.

References Cited in the file of this patent

UNITED STATES PATENTS

| | | |
|---|---|---|
| 2,384,521 | Andersen et al. | Sept. 11, 1945 |
| 2,462,331 | Myers | Feb. 22, 1949 |
| 2,525,691 | Lee et al. | Oct. 10, 1950 |
| 2,718,509 | Lundsted et al. | Sept. 20, 1955 |
| 2,732,592 | Tunnicliff et al. | Jan. 31, 1956 |
| 2,762,784 | Foust et al. | Sept. 11, 1956 |
| 2,772,246 | Simon et al. | Nov. 27, 1956 |
| 2,782,177 | Fischer et al. | Feb. 19, 1957 |
| 2,848,739 | Henning | Aug. 29, 1958 |